Aug. 4, 1970 E. H. LAND 3,523,159
COLOR TELEVISION RECEIVER AND DISPLAY SYSTEM
Filed July 26, 1967
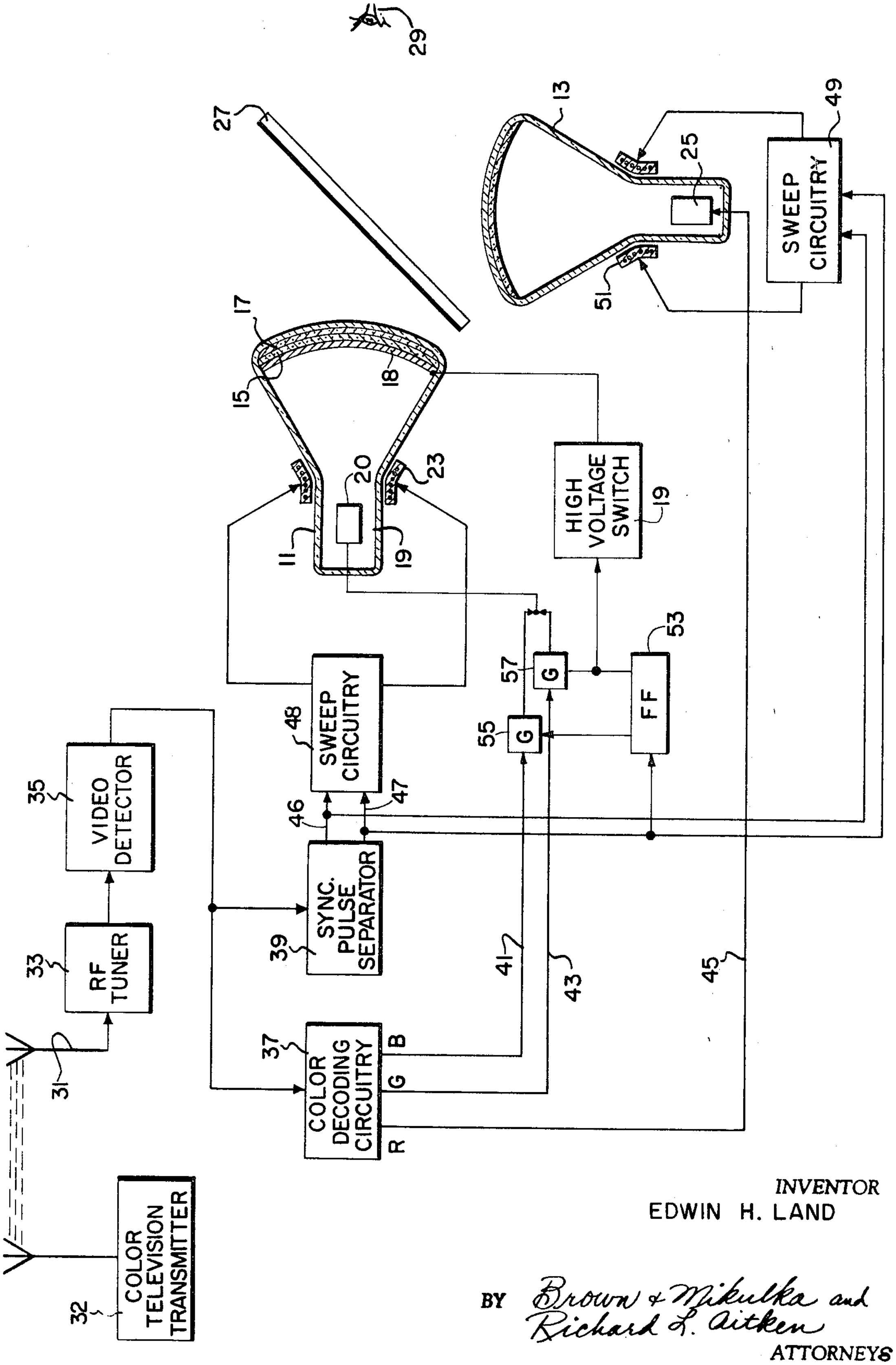
INVENTOR
EDWIN H. LAND
BY Brown & Mikulka and
Richard L. Aitken
ATTORNEYS United States Patent Office 3,523,159
Patented Aug. 4, 1970

3,523,159

COLOR TELEVISION RECEIVER AND DISPLAY SYSTEM

Edwin H. Land, Cambridge, Mass., assignor to Polaroid Corporation, Cambridge, Mass., a corporation of Delaware Filed July 26, 1967, Ser. No. 656,207
Int. Cl. H04r 9/22
U.S. Cl. 178—5.4 22 Claims

ABSTRACT OF THE DISCLOSURE

This patent specification discloses a color television receiver and display system employing two kinescopes. One of the kinescopes is a penetration-type binary kinescope on which superimposed image components are produced with different chromatic contents. One of the image components is produced in pale blue light by exciting blue and green phosphors in accordance with a received blue video signal and the other image component is produced preferably in green light in accordance with a received green video signal. The two images are produced in registration on the screen of the binary kinescope. The second kinescope is monochromatic and produces an image component in red light in accordance with a received red video signal. A dichroic mirror is used to combine the red image component and the green and pale blue image components into a composite full color image. Alternatively, the binary kinescope may produce red and white image components in accordance with the red and green video signals, in which case the monochromatic kinescope would produce an image component in blue light in accordance with the blue video signal.

BACKGROUND OF THE INVENTION

Some color television receivers and display system employ color picture tubes, the screen of which are formed of phosphor layers which produce light or different chromatic contents or colors when excited by impinging electrons. Images of more than one color are produced by accelerating the electrons in the electron beams to different velocities so that they penetrate to different depths in the laminated screen. Picture tubes which produce images of a plurality of colors in this manner are referred to as penetration-type color picture tubes.

The penetration-type of color television picture tube is particularly useful in producing color displays which take advantage of the phenomenon that a multi-colored scene can be perceived even though the objects in the scene are represented by different combinations of intensities of monochromatic and achromatic light. For example, a scene of multicolored objects can be perceived in a wide gamut of colors even though the objects represented in the scene are produced by different combinations of light generally regarded as red and white. This phenomenon is discussed in an article entitled "Experiments in Color Vision" by Edwin H. Land in the May 1959 issue of Scientific American. To make use of this phenomenon the penetration-type kinescope is controlled to produce superimposed red and white image components in accordance with received red and green video signals. The resulting composite image is perceived by the viewer as a polychromatic image.

The gamut of colors perceived by the viewer can be increased if a third image component in blue light produced in accordance with the received blue video signal is superimposed on the red and white image components. The additional blue image component could be provided by employing a kinescope with three phosphor layers and selectively exciting the layers by controlling the electron beam velocity in the same manner as is done with the two layer penetration-type kinescope. However, this arrangement presents problems because an electron beam may excite to some degree each layer that it passes through as well as the layer in which the electron beam is stopped. In addition, the image component which is produced by the excitation of the innermost layer must be viewed through the two outer layers which necessarily attentuate the brightness of the image component produced by the innermost layer.

BRIEF SUMMARY OF THE INVENTION

In accordance with the present invention, the above problems are avoided by using two kinescopes, one of which is a two layer penetration-type binary kinescope for producing two superimposed image components of different chromatic contents in accordance with two received color video signals and the other of which produces an image component of a third chromatic content in accordance with a third received color video signal. A dichroic mirror is used to combine the third image component with the first two image components to produce a composite image in full color. For example, in accordance with the present invention the binary kinescope could produce red and white image components in accordance with red and green video signals, in which case the monochromatic kinescope would produce a blue image component in accordance with the blue video signal to achieve the increased gamut of color perception.

The preferred embodiment of the present invention is based on the discovery that unexpectedly high color quality is achieved if the red image component produced in accordance with the red video signal is generated by the monochromatic kinescope. In this embodiment, the binary kinescope has an inner layer of phosphor which emits green light when excited and an outer layer of phosphor which emits blue light when excited by impinging electrons. The binary kinescope is controlled so that it excites only the inner layer in accordance with the received green video signal to produce a green image component and excites both the inner and outer layers in accordance with the received blue video signal to produce a pale blue image component. The color quality of the composite image that is obtained when the red image component is superimposed on the green and blue image components is striking. Flesh tones are natural and the blues in the image have none of the metallic or inky hue often found in the images produced by conventional television receivers.

Accordingly, an object of the present invention is to provide an improved color television receiver and display system.

Another object of the present invention is to improve the color quality in a color television receiver and display system.

A further object of this invention is to provide improved color quality in a color television receiver and display system utilizing a penetration type color television picture tube.

Further objects and advantages of the present invention will become readily apparent as the following detailed description of the invention unfolds and when taken in conjunction with the drawing.

BRIEF DESCRIPTION OF THE DRAWING

The single figure of the drawing schematically illustrates the color television system of the present invention.

DESCRIPTION OF THE PREFERRED EMBODIMENTS

As shown in the drawing, the receiver of the present invention comprises a binary penetration-type kinescope 11 and a monochromatic kinescope 13. The kinescope 11 has on its screen two layers of phosphor 15 and 17. When the phosphor of the inner layer 15 is excited by impinging electrons, it emits predominantly green light and accordingly it is referred to as a green phosphor. When the phosphor of the outer layer 17 is excited by impinging electrons, it emits predominantly blue light and accordingly it is referred to as a blue phosphor. An electrically conducting film 18 overlies the two phosphor layers 15 and 17 and is connected to receive a high positive voltage from a high voltage switch 19. The kinescope is provided with a single electron gun 20 and the velocity with which the electrons of the electron beam produced by the electron gun 20 enter the phosphor layers is determined by the voltage applied to the film 18. A high voltage switch 19 alternately applies 10 and 20 kilovolts to the film 18. When the switch 19 applies 10 kilovolts to the film 18, electrons of the electron beam only penetrate into the inner phosphor layer 15 so that the screen emits green light. When the switch 19 applies 20 kilovolts to the film 18, both layers 15 and 17 are excited and the screen emits pale blue light. The intensity of the electron beam produced by the electron gun 20 is controlled in accordance with a received green video signal while the high voltage switch applies 10 kilovolts to the film 18 so that an image component in green light is produced on the screen of the kinescope 11 in accordance with the received green video signal. The intensity of the electron beam is controlled in accordance with a received blue video signal while the high voltage switch 19 applies 20 kilovolts to the film 18 so that an image component in pale blue light is produced on the screen in accordance with the received blue video signal. Because the electron beam is accelerated to a higher velocity while the pale blue image component is being produced than while the green image component is being produced, compensation should be provided in order to make the green and pale blue image components the same size so that the green and pale blue image components register. This compensation may be provided for example by means of a wire mesh not shown positioned in the picture tube near the screen thereof in a manner fully described in U.S. Pat. No. 3,284,662 invented by Solly Kagan, issued Nov. 8, 1966.

The monochromatic kinescope 13 produces an image component in predominantly red light in response to a received red video signal applied to its electron gun 25. Accordingly the phosphor of the screen of the kinescope 13 is referred to as a red phosphor. The kinescopes 11 and 13 are arranged at right angles to one another and a dichroic mirror 27, which is adapted to reflect the red light produced by the kinescope 13 and to transmit the light produced by the kinescope 11, is positioned so that light from the green and pale blue image components produced by the kinescope 11 passes through the mirror 27 and light from the red image component produced by the kinescope 13 is reflected by the mirror 27 in registration with the green and pale blue image components produced by the kinescope 11. Thus, the red and green and pale blue image components are produced in registration as viewed by a viewer represented by the eye 29 and a polychromatic image of the televised scene with exceptionally high color quality is observed by the viewer.

The receiver is provided with an antenna 31 which intercepts a radio-frequency color television signal transmitted by a color television transmitter 32. The transmitter 32 includes a color television camera which produces red, green and blue image components of the scene being televised. From these image components the transmitter produces the radio frequency television signal. The radio frequency color television signal includes a radio frequency picture wave which is amplitude modulated with a composite color video signal, including a luminescent signal and a color sub-carrier amplitude and phase modulated with the color information in accordance with present broadcasting standards. The transmitted signal also includes sound information which is detected in a conventional manner but which will not be described in the present application for purposes of simplification. The antenna 31 will apply the intercepted color television signal to tuner 33, which converts the color television signal to an intermediate frequency and applies it to a video detector 35. The video detector 35 converts the applied intermediate frequency signal to a composite color video signal and applies the composite color video signal to a color decoder 37 and to a synchronization pulse separator 39. The color decoder 37 in response to the composite color video signal from the video detector 35 produces blue, green and red video signals on channels 41, 43 and 45, respectively. The synchronization pulse separator 39 separates out horizontal and vertical synchronization pulses from the applied video signal and applies the horizontal synchronization pulses to a channel 46 and applies the vertical synchronization pulses to channel 47. The channels 46 and 47 are connected to apply the horizontal and vertical synchronization pulses to sweep circuitry 48 for the kinescope 11 and sweep circuitry 49 for the kinescope 13. The sweep circuitry 48 generates conventional horizontal and vertical deflection signals in synchronism with the applied synchronization pulses and applies the deflection signals to the deflection coils 23 of the kinescope 11. The deflection coils 23 are energized by the applied deflection signals to cause the electron beam produced by the electron gun 20 to scan a viewing field on the screen of the kinescope 11 in a conventional manner. The sweep circuitry 49 similarly generates deflection signals in synchronism with the applied horizontal and vertical synchronization pulses and applies them to deflection coils 51 of the kinescope 13. The deflection coils 51 cause the electron beam produced by the electron gun 25 to scan a viewing field on the screen of the kinescope 13 in a conventional manner.

The vertical synchronization pulses produced on channel 47 are also applied to a flip-flop 53 which switches states in response to each applied synchronization pulse. In one state the flip-flop 53 will enable a gate 55 and in the opposite state the flip-flop 53 will enable a gate 57. The blue video signal produced on channel 41 is applied to the gate 55 and when the gate 55 is enabled this blue video signal will pass through the gate 55 to the electron gun 20 to control the intensity of the electron beam produced thereby. The green video signal produced on channel 43 is applied to the gate 57 and when the gate 57 is enabled the green video signal will pass through the gate 57 and be applied to the electron gun 20 to control the intensity of the electron beam. Thus, the intensity of the electron beam produced by the electron gun will alternately be controlled by the blue video signal and the green video signal switching from one video signal to the other each time a vertical synchronization pulse is produced. The output of the flip-flop 53 controlling the gate 57 is also applied to the high voltage switch 19 to control it to switch the voltage applied to the film 18 back and forth between 10 and 20 kilovolts in synchronism with the vertical synchronization pulses. The high voltage switch 19 is controlled by the output of the flip-flop 53 to apply 20 kilovolts to the film 18 while the gate 55 is being enabled and to apply 10 kilovolts to the film 18 while the gate 57 is being enabled. Thus, while the blue video signal is being applied to the electron gun 20, the electron beam will be accelerated to penetrate into the layer 17 so that pale blue light is produced by the screen of the kinescope. Accordingly, an image component in pale blue light will be produced in accordance with the blue video signal. The 10 kilovolts applied to the film 18 will cause the electron beam to penetrate only into the layer 15 while the green video signal is being applied to the electron gun 20 so that an image component in green light will be produced in accordance with a green video signal on the screen of the picture tube 11.

Because the flip-flop 53 is switched between its opposite states in response to the vertical synchronization pulses thus switching the video signal applied to the electron gun and switching the output of the high voltage switch 19 in synchronism with the vertical synchronization pulses, the green and blue image components will be produced on the screen of the picture tube 11 in alternate scannings of the viewing field of the picture tube. The reproduction of image components in this manner is called field sequential since the different image components are produced sequentially in alternate scannings of the field. Alternatively, the system could be line sequential system in which case the horizontal synchronization pulses would be applied to the flip-flop 53 so that the high voltage switch 19 would switch back and forth between 10 and 20 kilovolts in synchronism with the horizontal synchronization pulses and also the gates 55 and 57 would switch the green and blue video signals applied to the electron gun 20 in synchronism with the horizontal synchronization pulses. In such a line sequential system, the electron beam would alternately scan lines of the green and pale blue image components.

The red video signal produced on channel 45 is supplied to the electron gun 25 of the kinescope 13 so that a red image component is produced on the screen of the kinescope 13 in accordance with the received red video signal. In this manner, kinescopes 11 and 13 produce green, pale blue and red image components in accordance with the green, blue and red image components of the televised scene detected by the color television camera of the transmitter 32. The green, blue and red image components are viewed in registration by the viewer as a full color representation of the televised scene. With this arrangement, it will be noted that the green and pale blue image components are produced only on alternate scannings of the viewing field, whereas a red image component is produced on each scanning of the viewing field. Accordingly, green and pale blue image components are each produced only half the time the red image component is being produced. Thus, the brightness of the red image component relative to the blue and green image components is enhanced. This feature is an important advantage of the system of the present invention since the brightness of the red image component is a limiting factor in the overall picture brightness in most color television receivers. This advantage, however, does not explain the striking color quality that is achieved by the system of the present invention. This color quality is achieved as a result of the particular chromatic content of each of the image components which comprise the composite image perceived by the viewer. The key to the exceptional color quality achieved by the system of the present invention is the fact that the image component produced in accordance with the blue video consists of light generated by excitation of both green and blue phosphors, whereas the image component produced in accordance with the red video signal consists of light produced by the excitation of red phosphor and the image component produced in accordance with the green video signal consists of light generated by the excitation of only green phosphor.

The principles of the present invention relating to the exceptional color quality achieved as a result of the particular chromatic contents of the image components of the composite color image perceived by the viewer is not limited to the particular system of the preferred embodiment of the invention described above as other systems can be designed to produce image components with these chromatic contents. Also, the aspects of the present invention relating to the improvement of color quality in penetration type color television picture tubes by producing an image component with a monochromatic kinescope to be superimposed on image components produced by a penetration type kinescope is also not limited to systems producing image components having the particular chromatic contents described above. For example, improved color quality over prior art systems can be achieved if the monochromatic kinescope produces a blue image component in accordance with the blue video signal. In such an arrangement, the layers of phosphor on the screen of the binary kinescope would be selected to emit red and green light upon being excited by an impinging electron. The red layer would be excited in accordance with the red video signal to produce a red image component and both the red and green layers would be excited in accordance with the green video signal to produce a white or yellow image component in accordance with the green video signal. These and many other modifications may be made to the above-described specific embodiment of the present invention without departing from the spirit and scope of the invention, which is defined in the appended claims.

What is claimed is:

1. A color television display system comprising a first kinescope operable to produce on a screen thereof a first kinescopic image component of a first chromatic content and a second kinescopic image component of a second chromatic content superimposed upon and in registry with said first kinescopic image component, said first kinescope being a penetration type kinescope having a plurality of layers of phosphor on the screen thereof and producing said first and second image components by controlling the velocity with which electrons impinge upon said screen, a second kinescope operable to produce a third kinescopic image component of a third chromatic content, means to control said first kinescope to produce said first kinescopic image component in accordance with an image component of a first light wavelength content of a scene being televised and to produce said second kinescopic image component in accordance with an image component of a second light wavelength content of said scene being televised and to control said second kinescope to produce said third kinescopic image component in accordance with an image component of a third light wavelength content of said scene being televised, and means to present said third kinescopic image component in registry with said first and second kinescopic image components for display to a viewer whereby the viewer perceives a full color representation of said scene being televised.

2. A color television display system as recited in claim 1 wherein said second kinescope is arranged at right angles to said first kinescope and said mean to superimpose said third kinescopic image component on said first and second kinescopic image components comprises a dichroic mirror adapted and positioned to transmit the light produced on the screen of one of said kinescopes and to reflect the light produced on the screen of the other of said kinescopes so that said kinescopic image components can be viewed in registration.

3. A color television display system as recited in claim 1 wherein said first kinescopic image component is produced by exciting only one of said phosphors of said screen and said second kinescopic image component is produced by exciting a plurality of said phosphors of said screen.

4. A color television display system as recited in claim 3 wherein the chromatic content of said second kinescopic image component is of a pale color relative to that of said first and third kinescopic image components.

5. A color television display system as recited in claim 4 wherein said first kinescopic image component is predominantly green, said third kinescopc image component is predominantly red and said second kinescopic image component consists of light emitted by green and blue phosphors.

6. A color television receiver comprising a first kinescope operable to produce a first image component of a first chromatic content and a second image component of a second chromatic content superimposed on and in registry with said first image component, said first kinescope being a penetration type kinescope having a plurality of phosphors on the screen thereof and producing said first and second image components by controlling the velocity with which electrons impinge upon said phosphors, a second kinescope operable to produce a third image component of a third chromatic content, means to receive a color television signal and to control said first kinescope to produce said first image component in accordance with a first color video signal of said color television signal and to produce said second image component in accordance with a second color video signal of said color television signal and to control said second kinescope to produce said third image component in accordance with a third color video signal of said color television signal, and means to present said third image component in registry with said first and second image components for display to a viewer, whereby the viewer perceives a full color representation of the scene represented by said color television signal.

7. A color television receiver as recited in claim 6 wherein said second kinescope is arranged at an angle to said first kinescope and said means to superimpose said third image component on said first and second image components comprises a dichroic mirror adapted and positioned to transmit the light produced on the screen of one of said kinescopes and to reflect the light produced on the screen of the other of said kinescopes so that said image components can be viewed in registration.

8. A color television receiver as recited in claim 6 wherein said first image component is produced by exciting only one of the phosphors of said screen and said second image component is produced by exciting a plurality of said phosphors.

9. A color television receiver as recited in claim 8 wherein the chromatic content of said second image component is of a pale color relative to that of said first and third image components.

10. A color television receiver as recited in claim 9 wherein said first image component is predominantly green, said third image component is predominantly red, and said second image component consists of light emitted by blue and green phosphors.

11. A color television display system comprising display means operable to present a first predominantly red kinescopic image component, a second predominantly green telescopic image component in registration with said first image component, and a third kinescopic component in registration with said first and second kinescopic image components and consisting of light emitted by green and blue phosphors, and means to control said display means to present said first kinescopic image component in accordance with a red image component of the scene being televised, to present said second kinescopic image component in accordance with a green image component of the scene being televised, and to present said third kinescopic image component in accordance with a blue image component of the scene being televised.

12. A television display system as recited in claim 11 wherein said display means includes red, green and blue phosphors and wherein said display means presents said first kinescopic image component by exciting said red phosphor, presents said second kinescopic image component by exciting said green phosphor and presents said third kinescopic image component by exciting said green and blue phosphors.

13. A television display system as recited in claim 11 wherein said first image component is formed by light emitted by red phosphor and said second image component is formed by light emitted by green phosphor.

14. A television display system as recited in claim 11 wherein said second and third image components are presented for only half the time that said first image component is presented, per unit time interval.

15. A television receiver comprising display means operable to present a first predominantly red image component, a second predominantly green image component in registration with said first image component, and a third image component in registration with said first and second image component and consisting of light emitted by green and blue phosphors, and means to receive a color television signal and to control said display means to produce said first image component in accordance with the red video signal of said color television signal, to produce said second image component in accordance with the green video signal of said color television signal, and to produce said third image component in accordance with the blue video signal of said color television signal.

16. A color television receiver as recited in claim 15 wherein said display means includes red, green and blue phosphors and wherein said display means presents said first image component by exciting said red phosphor, presents said second image component by exciting said green phosphor and presents said third image component by exciting said green and blue phosphors.

17. A color television receiver as recited in claim 15 wherein said first image component is formed by light emitted by red phosphor and said second image component is formed by light emitted by green phosphor.

18. A color television receiver as recited in claim 15 wherein said second and third image components are produced for only half the time that said first image component is produced per unit time interval.

19. A color television display system comprising a first kinescope operable to produce on a screen thereof a first predominantly green kinescopic image component and a second kinescopic image component consisting of light emitted by green and blue phosphors superimposed upon and in registery with said first kinescopic image component, a second kinescope operable to produce a third predominantly red kinescopic image component, means to control said first kinescope to produce said first kinescopic image component in accordance with an image component of a first light wavelength content of a scene being televised and to produce said second kinescopic image component in accoordance with an image component of a second light wavelength content of said scene being televised and to control said second kinescope to produce said third kinescopic image component in accordance with an image component of a third light wavelength content of said scene being televised, and means to present said third kinescopic image component in registry with said first and second kinescopic image components for display to a viewer whereby the viewer perceives a full color representation of said scene being televised.

20. A color television display system comprising a first kinescope operable to produce on a screen thereof a first kinescopic image component of a first chromatic content and a second kinescopic image component of a second chromatic content superimposed upon and in registry with said first kinescopic image component, a second kinescope operable to produce a third kinescopic image component of a third chromatic content, the chromatic content of said second kinescopic image component being of a pale color relative to said first and third image components, means to control said first kinescope to produce said first kinescopic image component in accordance with an image component of a first light wavelength content of a scene being televised and to produce said second kinescopic image component in accordance with an image component of a second light wavelength content of said scene being televised and to control said second kinescope to produce said third kinescopic image component in accordance with an image component of a third light wavelength content of said scene being televised, and means to present said third kinescopic image component in registry with said first and second kinescopic image components for display to a viewere whereby the viewer perceives a full color representation of said scene being televised.

21. A color television receiver comprising a first kinescope operable to produce a first predominantly green image component and a second image component consisting of light emitted by blue and green phosphors superimposed on and in registry with said first image component, a second kinescope operable to produce a third predominantly red image component of a third chromatic content, means to receive a color television signal and to control said first kinescope to produce said first image component in accordance with a first color video signal of said color television signal and to produce said second image component in accordance with a second color video signal of said color television signal and to control said second kinescope to produce said third image component in accordance with a third color video signal of said color television signal, and means to present said third image component in registry with said first and second image components for display to a viewer, whereby the viewer perceives a full color representation of the scene represented by said color television signal.

22. A color television receiver comprising a first kinecope operable to produce a first image component of a first chromatic content and a second image component of a second chromatic content superimposed on and in registry with said first image component, a second kinescope operable to produce a third image component of a third chromatic content, the chromatic content of said second image component being of a pale color relative to that of said first and third image components, means to receive a color television signal and to control said first kinescope to produce said first image component in accordance with a first color video signal of said color television signal and to produce said second image component in accordance with a second color video signal of said color television signal and to control said second kinescope to produce said third image component in accordance with a third color video signal of said color television signal, and means to present said third image component in registry with said first and second image components for display to a viewer, whereby the viewer perceives a full color representation of the scene represented by said color telvision signal.

References Cited

UNITED STATES PATENTS

| | | | |
|---|---|---|---|
| 3,408,456 | 10/1968 | Shanafelt et al. ------ | 178—5.4 |
| 3,413,409 | 11/1968 | Giles -------------- | 178—5.4 |

ROBERT L. GRIFFIN, Primary Examiner

R. L. RICHARDSON, Assistant Examiner